United States Patent [19]

Boulanger

[11] Patent Number: 5,090,469
[45] Date of Patent: Feb. 25, 1992

[54] WINDOW SCREEN APPARATUS AND METHOD FOR MAKING

[76] Inventor: Henry J. Boulanger, 103 Red Bud Ct., Nicholsville, Ky. 40356

[21] Appl. No.: 691,216

[22] Filed: Apr. 25, 1991

Related U.S. Application Data

[63] Continuation-in-part of Ser. No. 461,813, Jan. 8, 1990, abandoned.

[51] Int. Cl.⁵ .............................................. E06B 9/00
[52] U.S. Cl. ................................. 160/368.1; 160/354; 160/370.2
[58] Field of Search ................. 160/368.1, 354, 370.2, 160/327; 296/97.8

[56] References Cited

U.S. PATENT DOCUMENTS

| | | | |
|---|---|---|---|
| 3,042,111 | 7/1962 | Wytovich | 160/370.2 X |
| 3,046,048 | 7/1962 | Cheney | 160/370.2 X |
| 3,753,458 | 8/1973 | Lazarek | 160/368.1 X |
| 4,510,986 | 4/1985 | Schwankl | 160/368.1 X |
| 4,802,523 | 2/1989 | Scholten et al. | 160/368.1 X |
| 4,867,222 | 9/1989 | Roman et al. | 160/368.1 X |

*Primary Examiner*—Blair M. Johnson
*Attorney, Agent, or Firm*—John A. Haug

[57] ABSTRACT

A window screen assembly is shown which is especially useful with metallic window frames having flat, irregular or compound curved surfaces defining the window opening. The assembly is flexible and readily stored in a compact space as by rolling it up for placement in a mailing type tube. The assembly includes magnets to secure the assembly to the frame.

10 Claims, 2 Drawing Sheets

WINDOW SCREEN APPARATUS AND METHOD FOR MAKING

This is a continuation in part of Ser. No. 461,813, filed Jan. 8, 1990, abandoned.

BACKGROUND OF INVENTION

This invention relates generally to window screens and more particularly to screens especially suitable for use with automotive vehicles.

Most vehicles that are used for transportation have powered ventilation systems with openings that are screened to prevent entry of insects. Recreational vehicles also have powered ventilation systems and many have screens on windows that are not part of the driver's field of view. The screened windows can provide ventilation during periods that the vehicle is not being powered.

There are situations for which screened windows would be desirable on vehicles not normally provided with them. Many automobiles, station wagons and vans are used occasionally to rest or sleep in. This might occur during overnight travel or if the vehicle is used as a base for camping. It is considered unsafe to allow the vehicle engine to run while parked in order to provide ventilation due to the poisonous nature of exhaust fumes. Further, if the ventilation system is operated for an extended period of time there is a chance of discharging the vehicle battery below the level necessary for restarting.

SUMMARY OF THE INVENTION

It is therefore an object of the invention to provide inexpensive screens that can easily be installed in automotive vehicle windows, removed and conveniently stored. Yet another object is the provision of a screen and frame assembly that is flexible to allow it to conform to irregular surfaces or surfaces with compound curves. Another object is the provision of a screen assembly that can be installed without the use of tools and one which leaves no disfiguring evidence on the vehicle after removal.

Various additional objects and advantages of the invention will become apparent from the following detailed description and accompanying drawings.

Briefly, in accordance with the invention, in order to cover a window opening, flexible magnetic strips can be attached to the top and bottom of a comparably configured piece of fiberglass screening by using a contact adhesive between the screen and the magnetic strips. The strength of this joint is enhanced by the addition of a strip of adhesive backed tape having low tensile strength such as aluminum to the screen on the side opposite the magnets. The tape is plastically deformed as by extruding it through the interstices of the screen with a bond occurring between the adhesive layers which firmly holds the screen. When it is desired to ventilate a vehicle, the fiberglass screen with the magnetic strips can be placed against the steel frame around the window of the vehicle. When the screen is pulled tightly the loose edges of the fiberglass will conform to the curvature of the frame. An even better seal can be achieved by placing individual lengths of magnet along the other edges of the screen. The magnetic attraction through the screen will hold the magnets and the screen to the frame. The magnets are preferably flexible so that they can conform to the compound curves that make up the surfaces of modern vehicles. This magnetic assembly holds tightly to the vehicle but can be removed easily. The screen can be rolled around the magnets and conveniently stored in a compact container such as a mailing tube.

BRIEF DESCRIPTION OF THE DRAWINGS

In the accopanying drawings in which several of the preferred embodiments of the invention are illustrated.

Figure 1:
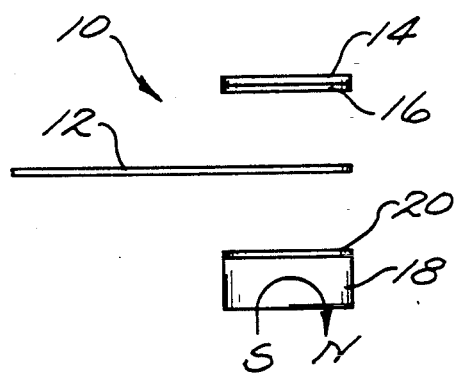
FIG. 1 shows an end view of a portion of a screen with attachment means blown apart.

Dimensions of certain parts as shown in the drawings may have been modified or exaggerated for the purpose of clarity of illustration.

DESCRIPTION OF THE PREFERRED EMBODIMENTS

Figure 2:
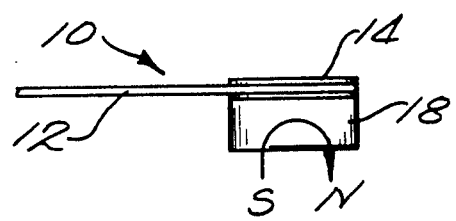
FIG. 2 is a view similar to FIG. 1 but with the attachment means in place on the screen.
Figure 2A:
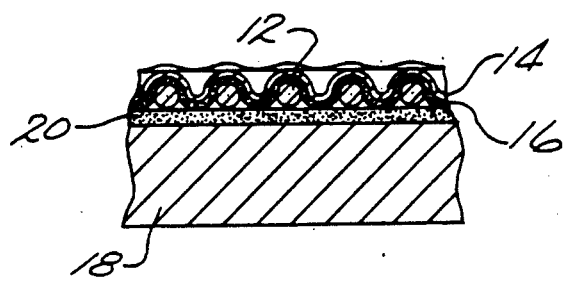
FIG. 2a is an enlarged cross sectional view of a portion of a screen and attachment means.
Figure 3:
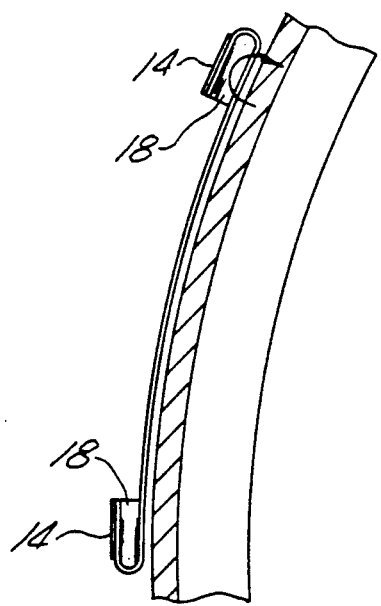
FIG. 3 is an end view of a screen assembly mounted on the door of a vehicle.

Referring now to the drawings, numeral 10 indicates a screen assembly made in accordance with the invention. With particular reference to FIGS. 1, 2 and 2a, a sheet 12 of screening material, such as fiberglass, a typical nominal thickness of which is approximately ten one-thousandths of an inch (ten mils) is provided with strips of flexible tape material 14 having an adhesive layer 16 of one or two mils of conventional adhesive such as a contact adhesive, placed on a first surface of sheet 12 at an edge thereof and a magnet 18, preferably provided with an adhesive layer 20 of one or two mils of similar adhesive material on its top surface, placed on a second, opposed surface of sheet 12. The material of tape 14 is selected to have a low tensile strength so the it can be permanently deformed into the interstices of the screening material. Although most readily available tapes comprise a plastic on which the adhesive is disposed, these are unsuitable because they have relatively high tensile strength and do not deform plastically. A plastic backed tape would only bend into the spaces between adjacent strands and be held temporarily by the tack of the adhesive. The constant tension on the bonding layer would cause a slow creep and release of the bond. For a suitable, lasting bond to occur the tape must deform into the interstices between individual strands of the screening. Aluminum has been found to be effective and is preferred since it has little tensile strength and is easily plastically deformed into the interstices presenting its adhesive layer for level engagement with the adhesive layer 20 on the back of magnet 18.

The assembly is formed by placing a screen sheet 12 onto layer 20 on magnet 18 and then tape 14 of aluminum or other low tensile strength material with adhesive 16 thereon is placed on top of screen sheet 12 in registry with layer 20. The tape is then rolled with a resilient roller of rubber, bristle or the like to cause a plastic deformation of the tape into the spaces between the individual screen strands. This deformation allows the abutting adhesive layers to coalesce and remain in contact on the side of the screen sheet contiguous with the magnet.

Although the assembly could be affixed to a vehicle with magnets on two opposite ends of sheet 10 by placing the magnets directly on the vehicle a gap would exist between the screen and vehicle at the transition at the edge of the magnet. To prevent this gap, the magnet is rolled over 180 degrees onto the screen which now has a smooth surface to abut the vehicle frame.

Figure 4:
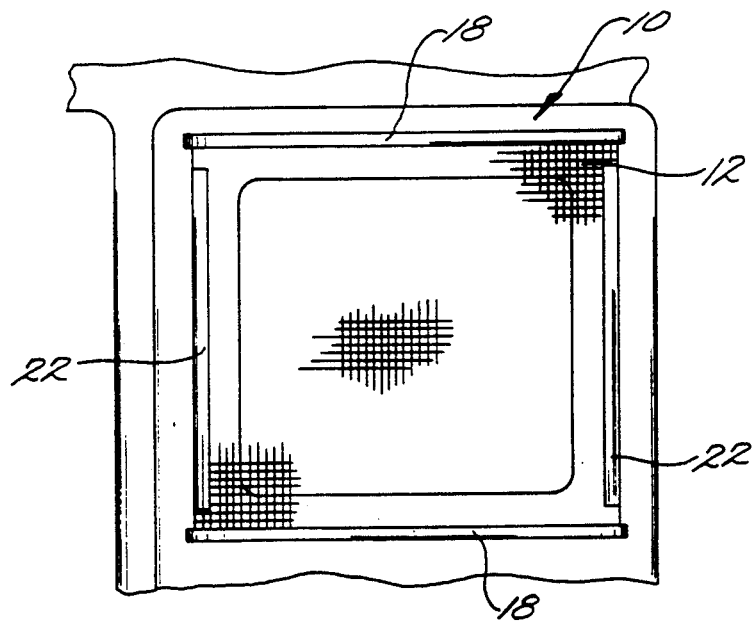
FIG. 4 is a plan view of a screen assembly installed on a window of a vehicle.

Magnets 18 are preferably formed of flexible strips of magnetic material such as Koroseal material, a tradename of RJF International Corporation. Supplemental magnets 22, either flexible magnetic strips similar to magnets 18 but without the adhesive layer, or other non flexible magnetic pieces can be placed over the sides of sheet 12 as indicated in FIG. 4.

In accordance with an alternate embodiment, the adhesive layer can be placed on the active face of the magnet. This eliminates the need to fold the sheet over, however the spacing between the magnet and frame is increased by the thickness of the tape thereby reducing the magnetic attraction. It will be understood that other adhesives such as epoxy, could be used as long as it is placed on a tape backing having low tensile strength so that the tape can be plastically deformed, however, the use of contact adhesive which is easy to handle is preferred. Additionally, short lengths of magnet fastened along the edge of the screen could replace the loose magnets and still allow compact storage.

The invention described above provides window screens that are easy to install, remove and store that requires no mechanical fasteners to hold them in place. The assembly is flexible allowing it to conform to irregular surfaces or surfaces having compound curves. The screens can be used without danger of causing disfigurement to the vehicle and can be installed without the use of tools by people unskilled in the use of tools. The screen assemblies are light in weight and they can be stored easily and compactly in their original shipping container.

Although the invention has been described with respect to specific preferred embodiments thereof, variations and modifications will become apparent to those skilled in the art. It is therefore the intention that the appended claims be interpreted as broadly as possible in view of the prior art to include all such variations and modifications.

I claim:

1. A process for placing ventilating screening material over an opening in a metal frame comprising the steps of taking an elongated strip of magnetic material having a layer of contact adhesive on a surface thereof, placing a sheet of screening material having interstices formed between individual strands of the screening material on the layer of adhesive, placing a tape of material having low tensile strength and having a layer of contact adhesive on a surface thereof on the sheet with the adhesive layer on the tape in engagement with the sheet and in alignment with the adhesive layer on the magnetic material, and permanently deforming the tape of material into the interstices so that the layers of adhesive coalesce on the side of the sheet of screening material facing the magnetic material.

2. A process according to claim 1 in which the tape is deformed by placing a force on it by rolling it with a resilient roller.

3. A process according to claim 1 in which the tape comprises aluminum.

4. A process according to claim 1 in which the sheet of screening material has a nominal thickness of approximately ten mils and the adhesive layers each have a thickness of approximately one to two mils.

5. A window screen assembly comprising a sheet of flexible material having a plurality of small interstices formed therethrough and having first and second opposed surfaces and having first and second opposite edge portions, a flexible tape having relatively low tensile strength disposed adjacent each opposite edge portion, the tape having a contact adhesive layer theron in contact with the first surface of the sheet, an elongated magnetic strip of material disposed adjacent each opposite edge portion, the strip having a contact adhesive layer thereon in contact with the second surface of the sheet, the tape and the strip at each edge being aligned with one another with the tape permanently deformed into the interstices of the sheet so that the adhesive layers are coalesced on the side of the sheet contiguous with the magnetic strip of material.

6. A window screen assembly according to claim 5 in which the magnetic strip is formed of flexible material.

7. A window screen assembly according to claim 5 further including supplemental magnetic elements for placement on other edge portions of the sheet.

8. A window screen assembly according to claim 5 in which the tape comprises aluminum.

9. A process for placing ventilating screening material over an opening defined in a metal frame comprising the steps of taking a sheet of flexible material having first and second opposite surfaces and having a plurality of strands forming a plurality of small interstices, placing a flexible tape having relatively low tensile strength and having a first contact adhesive layer thereon in contact with the first surface of the sheet along two opposite edges thereof, placing an elongated magnetic strip of material having a second contact adhesive layer thereon in contact with the second surface of the sheet aligned with the tape, pressing the tape onto the sheet and the elongated strip of magnetic material to plastically deform the tape through the interstices to coalesce the first and second adhesive layers on the side of the sheet contiguous to the magnetic strip of material, wrapping the screening material 180 degrees around each magnetic strip and placing the magnet strip of material on the metal frame with a single layer of screening material therebetween to form a close fit of the screening material over the opening.

10. A process according to claim 9 in which the tape comprises aluminum.

* * * * *